(12) United States Patent
Mori

(10) Patent No.: US 9,372,366 B2
(45) Date of Patent: Jun. 21, 2016

(54) DISPLAY DEVICE

(71) Applicant: Japan Display Inc., Minato-ku (JP)

(72) Inventor: Ayumi Mori, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/809,602

(22) Filed: Jul. 27, 2015

(65) Prior Publication Data

US 2015/0331265 A1 Nov. 19, 2015

Related U.S. Application Data

(62) Division of application No. 14/087,305, filed on Nov. 22, 2013, now Pat. No. 9,128,331.

(30) Foreign Application Priority Data

Mar. 29, 2013 (JP) ................................. 2013-072230

(51) Int. Cl.
*G02F 1/1339* (2006.01)
*G02F 1/1335* (2006.01)
*G02F 1/1341* (2006.01)
*G02F 1/1333* (2006.01)

(52) U.S. Cl.
CPC ............ *G02F 1/1339* (2013.01); *G02F 1/1341* (2013.01); *G02F 1/133345* (2013.01); *G02F 1/133514* (2013.01); *G02F 1/133351* (2013.01)

(58) Field of Classification Search
CPC .......................... G02F 1/1339; G02F 1/133514
See application file for complete search history.

(56) References Cited

U.S. PATENT DOCUMENTS

| 6,882,399 B2 | 4/2005 | Park |
| 2010/0053512 A1 | 3/2010 | Taniguchi et al. |
| 2010/0079718 A1 | 4/2010 | Sekiya et al. |

FOREIGN PATENT DOCUMENTS

JP 2012-032506 2/2012

*Primary Examiner* — Wen-Ying P Chen
(74) *Attorney, Agent, or Firm* — Oblon, McClelland, Maier & Neustadt, L.L.P

(57) ABSTRACT

A first substrate includes a first insulating substrate. A first organic insulating film is arranged on the first substrate in a circumference area outside an active area. The first organic insulating film includes a first surface and a first concave portion in the circumference area. A second substrate includes a second insulating substrate. A circumference color filter is laminated on a circumference shield layer and includes a second concave portion arranged facing the first concave portion. The second concave portion spreads toward the first substrate. A second organic insulating film covers the circumference color filter and includes a second surface and a third concave portion covering the second concave portion. A seal material is arranged between the first surface and the second surface, and between the first concave portion and the third concave portion to attach the first substrate and the second substrate.

15 Claims, 4 Drawing Sheets

DISPLAY DEVICE

CROSS-REFERENCE TO RELATED APPLICATION

This application is a divisional of U.S. application Ser. No. 14/087,305 filed Nov. 22, 2013 and is based upon and claims the benefit of priority from prior Japanese Patent Application No. 2013-72230, filed Mar. 29, 2013, the entire contents of which are incorporated herein by reference.

FIELD

Embodiments described herein relate generally to a liquid crystal display device.

BACKGROUND

Liquid crystal display devices are widely used as typical display devices for various kinds of equipments. The liquid crystal display panel holding a liquid crystal layer between an array substrate and a counter substrate is manufactured using a large-sized mother substrate. That is, after manufacturing a plurality of liquid crystal display panels collectively, each liquid crystal display panel is obtained by cutting the mother substrate.

In recent years, a frame portion of the liquid crystal display panel, i.e., the width between an active area and a panel end tends to become narrow. More demand for the narrow frame is growing, more variations of location and width of a seal material to attach the array substrate and the counter substrate are resulted due to bad accuracy of the seal material formation, and also variation of distance between a cut line of the mother substrate and an outer end of the seal material is easily resulted. For this reason, there is a possibility that variation in cutting accuracy may be caused due to the variation generated in the seal material.

On the other hand, technology which arranges a black seal material is proposed so that the seal material is shared with the adjacent liquid crystal display panels in the mother substrate.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
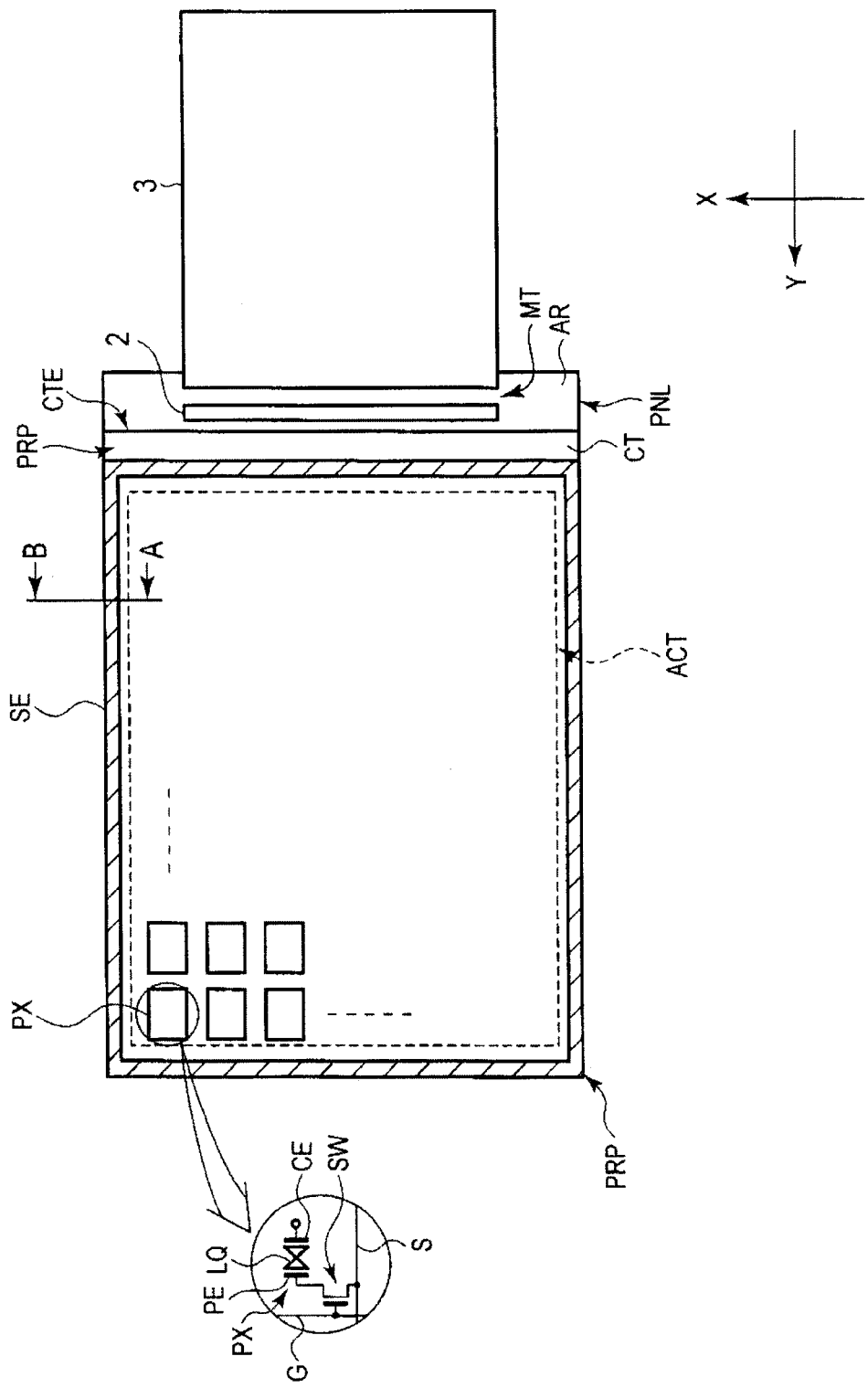
FIG. 1 is a plan view schematically showing a display panel PNL applicable to the liquid crystal display device according to an embodiment.

A liquid crystal display device according to an exemplary embodiment of the present invention will now be described with reference to the accompanying drawings wherein the same or like reference numerals designate the same or corresponding portion s throughout the several views.

According to one embodiment, a liquid crystal display device includes: a first substrate including; a first insulating substrate, and a first organic insulating film arranged in a circumference area outside an active area for displaying images, the first organic insulating film including a first surface and a first concave portion in the circumference area, a second substrate including; a second insulating substrate, a circumference shield layer arranged on the second insulating substrate facing the first substrate in the circumference area, a circumference color filter laminated on the circumference shield layer in the circumference area and including a second concave portion arranged facing the first concave portion, the second concave portion penetrating to the circumference shield layer and spreading toward the first substrate, and a second organic insulating film covering the circumference color filter and including a second surface and a third concave portion covering the second concave portion in the circumference area, a seal material arranged between the first surface and the second surface and between the first concave portion and the third concave portion to attach the first substrate and the second substrate, and a liquid crystal layer held inside surrounded with the seal material between the first substrate and the second substrate.

According to other embodiment, a liquid crystal display device includes: a first substrate including; a first insulating substrate, and a first organic insulating film arranged in an circumference area outside an active area for displaying images, the first organic insulating film including a first surface and a first concave portion in the circumference area, a second substrate including; a second insulating substrate, a circumference shield layer arranged on the second insulating substrate facing the first substrate in the circumference area, a circumference color filter laminated on the circumference shield layer and including a second a concave portion arranged facing the first concave portion, the second concave portion penetrating to the circumference shield layer and spreading toward the first substrate, and a second organic insulating film covering the circumference color filter and including a second surface and a third concave portion covering the second concave portion in the circumference area, a seal material arranged between the first surface and the second surface, and between the first concave portion and the third concave portion to attach the first substrate and the second substrate; and a liquid crystal layer held inside surrounded with the seal material between the first substrate and the second substrate, wherein the seal material extends to a position in which a first end portion of the first insulating substrate overlaps with a second end portion of the second substrate, the liquid crystal display device further comprises a spacer arranged between the first surface and the second surface in a position in which the first end portion of the first insulating substrate overlaps with the second end portion of the second substrate, the spacer linearly extends along the position in which the first end portion overlaps with the second end portion, and the seal material is arranged between the first surface and the spacer or between the second surface and the spacer.

FIG. 1 is a plan view schematically showing a display panel PNL applicable to the liquid crystal display device according to an embodiment of the present invention.

The display panel PNL is formed of an active-matrix type liquid crystal display panel, and equipped with a liquid crystal layer LQ held between an array substrate AR and a counter substrate CT facing the array substrate AR. The array substrate AR and the counter substrate CT are pasted together by a seal material SE while a predetermined cell gap is formed between the substrates. The cell gap is formed of pillar-shaped spacers formed in the array substrate AR or the counter substrate CT. The liquid crystal layer LQ is held in the cell gap between the array substrate AR and the counter substrate CT on the inner side surrounded by the seal material SE. The display panel PNL is equipped with an active area ACT which displays a picture on the inner side surrounded by the seal material SE. The active area ACT is formed of an approximately rectangular shape, and formed of a plurality of pixels PX arranged in the shape of a matrix, for example.

The array substrate AR is equipped with a gate line G extending in a first direction X, a source line S extending in a second direction Y so as to cross the gate line G, a switching element SW connected with the gate line G and the source line S, a pixel electrode PE connected with the switching element SW, etc. Although the counter substrate CT is equipped with a counter electrode CE facing each of the pixel electrodes PE through the liquid crystal layer LQ, for example, the array substrate AR may be equipped with the counter electrode CE.

In addition, explanation is omitted about the detailed structure of the display panel PNL. In the modes such as TN (Twisted Nematic) mode, OCB (Optically Compensated Bend) mode, and VA (Vertical Aligned) mode which mainly use vertical electric field, while the array substrate AR is equipped with the pixel electrode PE, the counter substrate CT is equipped with the counter electrode CE. Moreover, the array substrate AR is equipped with the both of the pixel electrode PE and the counter electrode CE in the modes which mainly use lateral electric field, such as IPS (In-Plane Switching) mode and FFS (Fringe Field Switching) mode.

A signal source necessary to drive the display panels PNL, such as a driving IC chip 2 and a flexible printed circuit (FPC) substrate 3, is mounted in a circumference area PRP outside the active area ACT. In this embodiment, the driving IC chip 2 and the FPC substrate 3 are mounted in a mounting portion MT of the array substrate AR which extends to outside a substrate end CTE of the counter substrate CT. The circumference area PRP is an area surrounding the active area ACT, and formed in the shape of a rectangular frame including an area in which the seal material SE is arranged. In addition, the illustrated display panel PNL is formed in a square form. In three sides except the mounting portion MT, substrate ends of the array substrate AR and substrate ends of the counter substrate CT overlap each other, and form panel ends. The seal material extends up to the panel ends of the three sides except the mounting portion MT.

Figure 2:
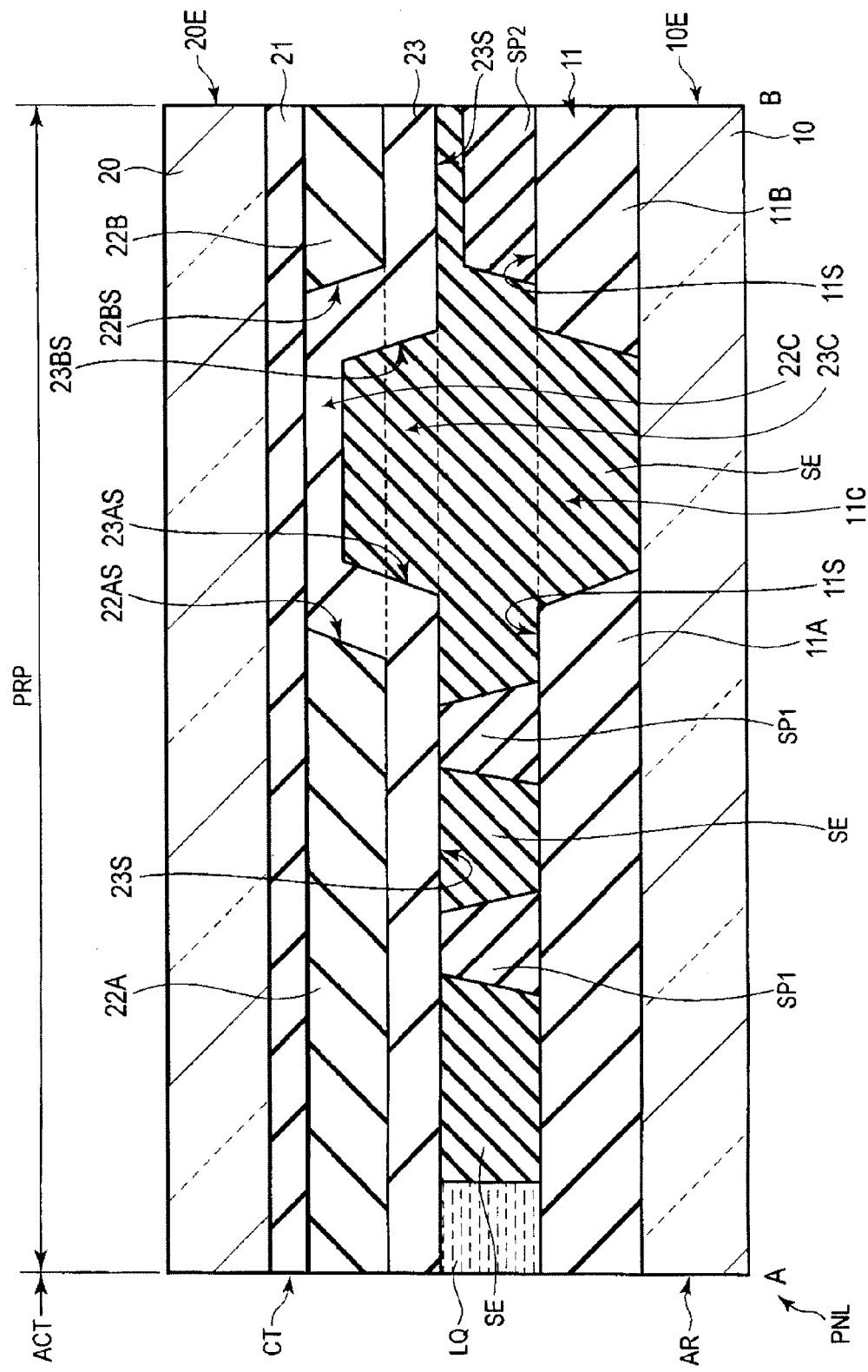
FIG. 2 is a cross-sectional view schematically showing a structure in a circumference area PRP of the display panel PNL taken along line A-B shown in FIG. 1.

FIG. 2 is a cross-sectional view schematically showing a structure in a circumference area PRP of the display panel PNL taken along line A-B shown in FIG. 1.

The Array substrate AR is formed using a transparent first insulating substrates 10, such as a glass substrate and a resin substrate. The array substrate AR is equipped with a circumference wiring which is not shown and a first organic insulating film 11, etc., in the circumference area PRP. In addition, although not illustrated, the array substrate AR is equipped with the switching element, the pixel electrode, the alignment film, etc, in the active area ACT on the first insulating substrate 10 facing the counter substrate CT. Moreover, in the circumference area PRP, other insulating films may be arranged between the first insulating substrate 10 and the first organic insulating film 11.

The first organic insulating film 11 extends not only to the circumference area PRP but the active area ACT. In the circumference area PRP, the first organic insulating film 11 includes a first segment 11A on a side close to the active area ACT and a second segment 11B on a side close to a substrate end 10E of the array substrate AR. The second segment 11B extends up to the substrate end 10E. In the illustrated example, a first concave portion 11C is formed between the first segment 11A and the second segment 11B in the first organic insulating film 11. The first segment 11A and the second segment 11B face the counter substrate CT, respectively, and include a first substantially flat surface 11S, respectively. The first concave portion 11C has a depth penetrating to the first insulating substrate 10, for example. The organic insulating film 11 is formed, for example, of a transparent resin material.

On the other hand, the counter substrate CT is formed using a transparent second insulating substrate 20, such as the glass substrate and the resin substrate. The counter substrate CT is equipped with a circumference shield layer 21, a circumference color filter 22, a second organic insulating film 23, etc., in the circumference area PRP on the second insulating substrate 20 so as to face the array substrate AR. In addition, although not illustrated, the counter substrate CT is equipped with a black matrix, a color filter layer, an alignment film, etc. in the active area ACT.

The circumference shield layer 21 is formed on the second insulating substrate 20 facing the array substrate AR, and extends to substantially whole area of the circumference area PRP. That is, the circumference shield layer 21 is located in respective above portions of the first segment 11A, the second segment 11B, and the first concave portion 11C, and formed continuously without breaking off up to a substrate end 20E of the counter substrate CT. The circumference shield layer 21 has a constant film thickness. Moreover, the circumference shield layer 21 is formed with the same material as the black matrix in the active area ACT, and connected with the black matrix. The circumference shield layer 21 is formed of the resin material colored in black or light shielding metal material such as chromium (Cr), etc.

The circumference color filter 22 is laminated on the circumference shield layer 21. In the circumference area PRP, the circumference color filter 22 includes a second segment 22B on a side close to the substrate end 20E while including a first segment 22A on a side close to the active area ACT. The second segment 22B extends up to the substrate end 20E. In the illustrated example, a second concave portion 22C is formed between the first segment 22A and the second segment 22B in the circumference color filter 22. The second concave portion 22C has a depth penetrating to the circumference shield layer 21, for example. The second concave portion 22C is formed in a position which counters with the first concave portion 11C. The second concave portion 22C is formed so that the second concave portion 22C gradually spreads from a portion penetrating up to the circumference shield layer 21 toward the array substrate AR. That is, the second concave portion 22C is formed between a slope face 22AS located at an end of the first segment 22A, and a slope face 22BS located at an end of the second segment 22B.

The second organic insulating film 23 extends to not only the circumference area PRP but the active area ACT. In the circumference area PRP, the second organic insulating film 23 covers the second concave portion 22C while covering the circumference color filter 22. That is, the second organic insulating film 23 covers the circumference shield layer 21 exposed by the second concave portion 22C while being laminated on the first segment 22A and the second segment 22B. In the illustrated example, a third concave portion 23C is formed in a position which covers the second concave portion 22C in the second organic insulating film 23. The second organic insulating film 23 laminated on the first segment 22A and the second segment 22B includes a second substantially flat surface 23S. The second surface 23S counters a first surface 11S. If its attention is paid to the third concave portion 23C, the third concave portion 23C is formed so that the third concave portion 23C gradually spreads from its bottom portion toward the array substrate AR. That is, the third concave portion 23C is formed between a gentle slope face 23AS which covers the slope face 22AS and a gentle slope face 23BS which covers the slope face 22BS. The slope face 23AS and slope face 23BS incline toward the bottom of the third concave portion 23C from the second surface 23S. The second organic insulating film 23 is formed of a transparent resin material, for example.

The display panel PNL is further equipped with a first spacer SP1 and a second spacer SP2 in the circumference area PRP. Each of the first spacer SP1 and second spacer SP2 is arranged between the first surface 11S and the second surface 23S. The first spacer SP1 is located on a side close to the active area ACT, and the second spacer SP2 is located on the substrate ends 10E, 20E side. In the illustrated example, the first spacer SP1 and second spacer SP2 are formed in the array substrate AR. Precisely, the first spacer SP1 and second spacer SP2 are formed on the first surface 11S of the first organic insulating film 11 in the shape of taping off toward the counter substrate CT. A tip portion of the first spacer SP1 touches to the second surface 23S. The tip portion of the second spacer SP2 is apart from the second surface 23S. In addition, the counter substrate CT may be equipped with each of the first spacer SP1 and the second spacer SP2. In this case, they are formed on the second surface of the second organic insulating film 23, and formed in the shape of tapering off toward the array substrate AR.

The seal material SE which attaches the array substrate AR and the counter substrate CT are filled between the first surface 11S and the second surface 23S. Moreover, the seal material SE is filled in the first concave portion 11C and the third concave portion 23C. Furthermore, the seal material SE is filled between the second spacer SP2 and the second surface 23S, and extends up to the position in which the substrate end 10E and the substrate end 20E overlap each other. The first spacer SP1 is surrounded with the seal material SE.

The liquid crystal layer LQ is enclosed inside the seal material SE (active area side).

Figure 3:
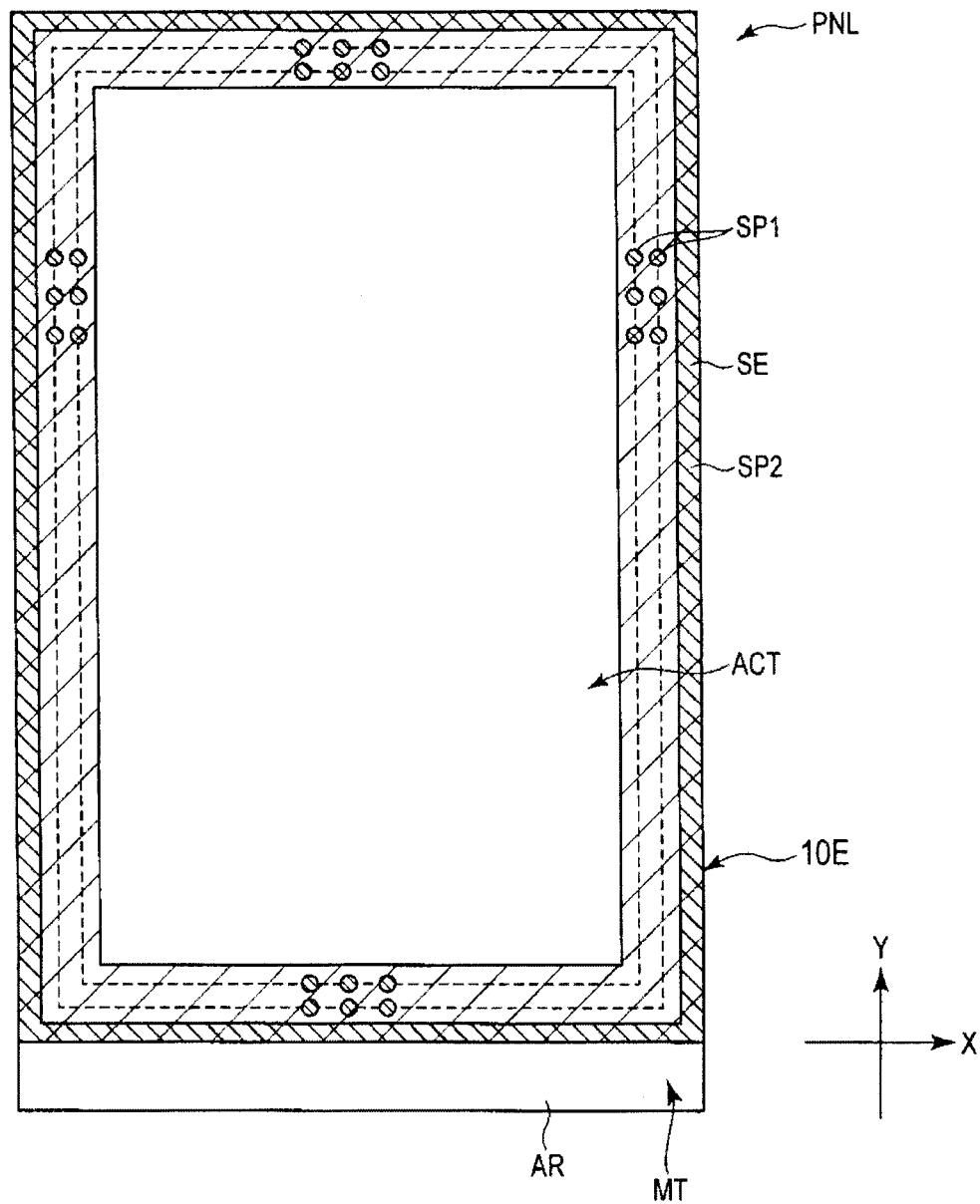
FIG. 3 is a view showing a layout of a seal material SE, a first spacer SP1 and a second spacer SP2 in the display panel PNL according to the embodiment.

FIG. 3 is a view showing a layout of the seal material SE, the first spacer SP1 and the second spacer SP2 in the display panel PNL according to the embodiment. Here, only the principal portion required for explanation is illustrated.

The seal material SE extends up to the substrate end 10E in the three sides of the array substrate AR except the mounting portion MT. The first spacer SP1 is located inside the seal material SE, and formed in the shape of a dot. Although the illustrated example shows the case where the first spacer SP1 is formed in two lines, the layout of first spacer SP1 is not restrict to this example. In the three sides except the mounting portion MT, the second spacer SP2 is formed in the shape of a straight line along the substrate end 10E. Although the illustrated example shows the case where the second spacer SP2 is formed in the shape of a rectangular frame which continuously extends, the form of the second spacer SP2 is not restricted to this example.

Figure 4:
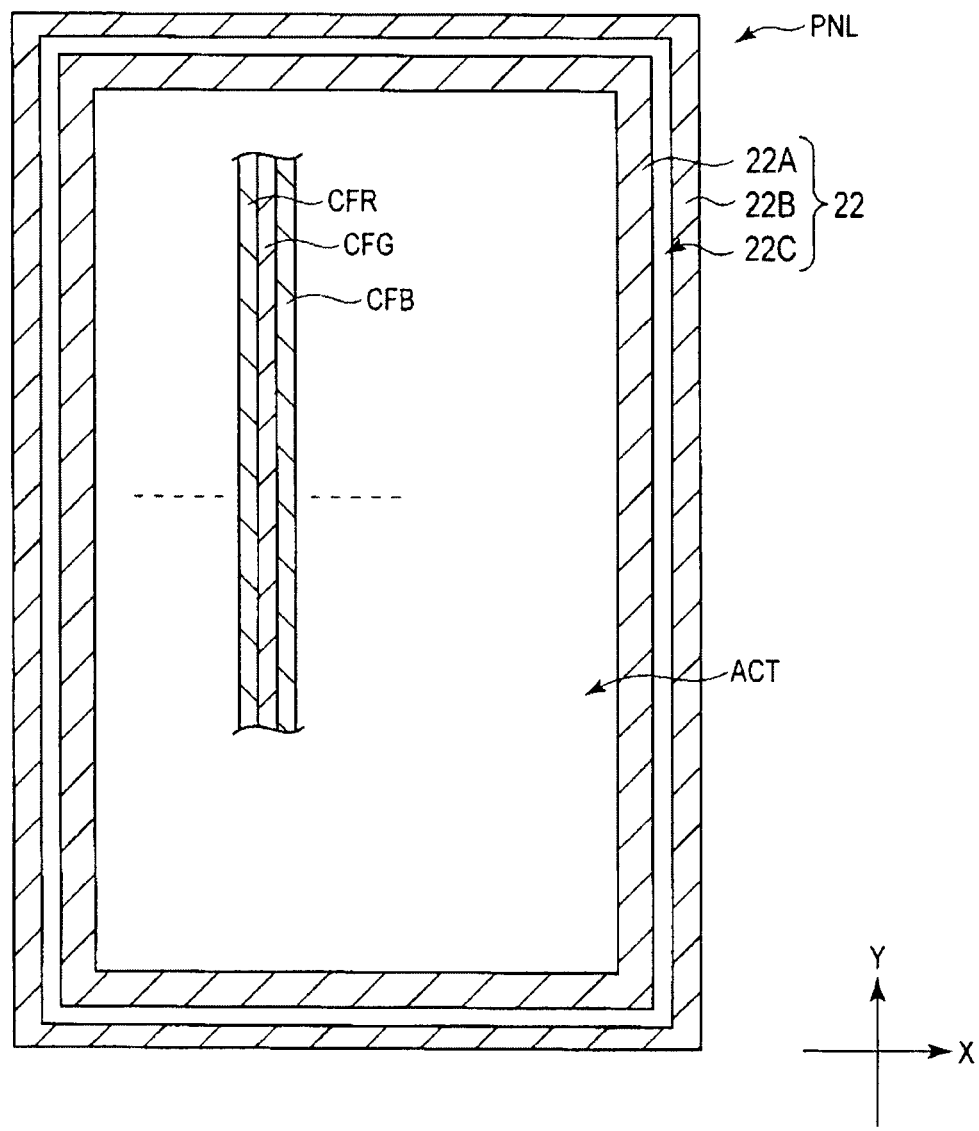
FIG. 4 is a plan view schematically showing a layout of a circumference color filter 22 according to the embodiment.

FIG. 4 is a plan view schematically showing a layout of the circumference color filter 22 according to the embodiment. Here, only the principal portion required for explanation is illustrated.

In this embodiment, the first segment 22A and the second segment 22B of the circumference color filter 22 are formed in the shape of a straight line extending in the first direction X and the second direction Y. The first segment 22A is formed in the shape of a rectangular frame surrounding the rectangular active area ACT. The second segment 22B is located in the outside of the first segment 22A so as to sandwich the second concave portion 22C with the first segment 22A. The second segment 22B is located in the outermost circumference (panel end) of the display panel PNL. In addition, although not illustrated, the first spacers SP1 in the shape of a dot are dotted in a position which overlaps with the first segment 22A. Moreover, the second spacer SP2 in the straight line shape is formed in a position which overlaps with the second segment 22B. In this embodiment, although the first segment 22A and the second segment 22B are formed in the shape of a frame formed continuously, respectively, they may break off on the way.

The color filter arranged in the active area ACT is formed of a red color filter CFR arranged corresponding to a red pixel, a green color filter CFG arranged corresponding to a green pixel and a blue color filter CFB arranged corresponding to a blue pixel. The color filters are formed of the resin material colored in red, green, blue, etc., respectively. The above-mentioned circumference color filter 22 is formed with the same material as one of the color filter layers arranged in the active area ACT. In this embodiment, the circumference color filter 22 is formed with the same material as the blue color filter CFB, for example.

Next, an example of a manufacturing method of the above-mentioned display panel PNL is explained briefly.

First, the first mother substrate which collectively forms a plurality of array substrates AR is prepared. The first mother substrate is formed using an insulating substrate which becomes the first insulating substrate, and equipped with various wirings, such as the gate line, the source line, the switching element, etc., various insulating films such as the organic insulating film, the pixel electrode, the alignment film, the first spacer, the second spacer, etc.

On the other hand, the second mother substrate which collectively forms a plurality of counter substrates CT is prepared. The second mother substrate is formed using the insulating substrate which becomes the second insulating substrate, and equipped with the black matrix, the circumference shield layer, the circumference color filter, the color filter layer, the second organic insulating film, the alignment film, etc.

Then, after arranging the seal material on the first mother substrate or the second mother substrate so that the seal material surrounds the active area respectively, the liquid crystal material is dropped on the inner side surrounded with the seal material. Successively, the first mother substrate and the second mother substrate are attached together.

Then, the display panel PNL is taken out from a pair of mother substrates in which the liquid crystal layer is held between the first mother substrate and the second mother substrate. In this process, the both of the first mother substrate and the second mother substrate are cut along cutting lines, respectively. Thereby, the display panel PNL holding the liquid crystal layer LQ between the array substrate AR and the counter substrate CT is manufactured.

According to this embodiment, in the region in which the seal material SE is arranged, the first concave portion 11C is formed in the array substrate AR. The third concave portion 23C is formed in the region which counters the first concave portion 11C in the counter substrate CT. Especially, the third concave portion 23C has a form which spreads as the third concave portion 23C goes to the array substrate AR from its bottom side, and is specified between the gently inclined slope faces 23AS and 23BS. For this reason, since the seal material SE spreads along the gentle slope faces 23AS and 23BS toward the substrate ends 10E and 20E when the seal material SE spreads in a width direction, it becomes possible to reduce resistance at the spreading time of the seal material SE. Therefore, the seal material SE easily spreads up to the substrate ends 10E and 20E.

In recent years, the demand for the narrow frame with a short distance between the active area ACT and the substrate ends 10E and 20E is increasing. For this reason, although we are anxious about the variation in the cutting accuracy resulting from formation accuracy of the seal material SE, since the spreading resistance of the seal material SE is reduced, the seal material SE easily spreads up to the substrate ends 10E and 20E. Thereby, it becomes possible to reduce the variation in the formation accuracy of the seal material SE, and to reduce the variation in the cutting accuracy resulting from the formation accuracy of the seal material SE. Accordingly, it becomes possible to control the fall of the manufacturing yield.

Moreover, since the seal material SE is filled up not only between the first surface 11S of the first organic insulating film 11 and the second surface 23S of the second organic insulating film 23 but also between the first concave portion 11C and the third concave portion 23C, it becomes possible to increase the amount of the applied seal material SE. Further, it becomes possible to increase the areas of the array substrate and the counter substrate, in which the seal material SE contacts the substrates, respectively. For this reason, it becomes possible to improve adhesive strength to attach the array substrate AR and the counter substrate CT by the seal material SE.

As explained above, according to the embodiment, the liquid crystal display device which can control fall of manufacturing yield can be supplied.

While certain embodiments have been described, these embodiments have been presented by way of example only, and are not intended to limit the scope of the inventions. In practice, the structural and method elements can be modified without departing from the spirit of the invention. Various embodiments can be made by properly combining the structural and method elements disclosed in the embodiments. For example, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope of the inventions.

The invention claimed is:

1. A display device, comprising:
   a first substrate including:
      a first insulating substrate, and
      a first resin layer arranged in a peripheral area outside an active area for displaying images, the first resin layer including a first surface and a first groove portion in the peripheral area; and
   a second substrate including:
      a second insulating substrate, and
      a second resin layer arranged above the second insulating substrate facing the first substrate in the peripheral area, the second resin layer including a second surface and a second groove portion arranged facing the first groove portion in the peripheral area, wherein
   the first and second resin layers are formed of organic insulating materials, and
   the second resin layer is formed of an organic insulating film arranged on a side of the first surface and a color filter arranged on a side of the second substrate, and the second groove portion is formed in the color filter.

2. The display device according to claim 1, wherein the second groove portion spreads toward the first substrate.

3. The display device according to claim 1, wherein the first groove portion spreads toward the second substrate.

4. The display device according to claim 1, wherein a seal material is arranged between the first surface and the second surface and between the first groove portion and the second groove portion to attach the first substrate and the second substrate.

5. The display device according to claim 4, further comprising a spacer arranged between the first substrate and the second substrate in a position in which a first end portion of the first insulating substrate overlaps with a second end portion of the second substrate.

6. The display device according to claim 4, wherein the seal material extends to a position in which a first end portion of the first insulating substrate overlaps with a second end portion of the second substrate.

7. The display device according to claim 5, wherein the seal material is arranged between the first surface and the spacer or between the second surface and the spacer.

8. The display device according to claim 1, wherein the second groove portion penetrates the color filter.

9. A display device, comprising:
   a first substrate including:
      a first insulating substrate, and
      a first resin layer arranged in a peripheral area outside an active area for displaying images, the first resin layer including a first surface and a first groove portion in the peripheral area; and
   a second substrate including:
      a second insulating substrate, and
      a second resin layer arranged above the second insulating substrate facing the first substrate in the peripheral area, the second resin layer including a second surface and a second groove portion arranged facing the first groove portion the peripheral area, wherein
   the first and second resin layers are formed of organic insulating materials,
   the second resin layer is formed of an organic insulating film arranged on a side of the first surface and a color filter arranged, on a side of the second substrate, the second groove portion is formed in the organic insulating film, and
   the color filter includes a third groove portion, the second resin layer covers the color filter and the third groove portion, and the third groove portion faces the first groove portion.

10. The display device according to claim 9, wherein the second groove portion spreads toward the first substrate.

11. The display device according to claim 9, wherein the first groove portion spreads toward the second substrate.

12. The display device according to claim 9, wherein a seal material is arranged between the first surface and the second surface and between the first groove portion and the second groove portion to attach the first substrate and the second substrate.

13. The display device according to claim 12, further comprising a spacer arranged between the first substrate and the second substrate in a position in which a first end portion of the first insulating substrate overlaps with a second end portion of the second substrate.

14. The display device according to claim 12, wherein the seal material extends to a position in which a first end portion of the first insulating substrate overlaps with a second end portion of the second substrate.

15. The display device according to claim 13, wherein the seal material is arranged between the first surface and the spacer or between the second surface and the spacer.

* * * * *